US012741372B2

(12) United States Patent
Krieg et al.

(10) Patent No.: US 12,741,372 B2
(45) Date of Patent: Sep. 22, 2026

(54) METHOD FOR HANDLING OBJECTS AND HANDLING SYSTEM

(71) Applicant: J.Schmalz GmbH, Glatten (DE)

(72) Inventors: Steffen Krieg, Waldenbuch (DE); Bernd Heinzmann, Loßburg (DE)

(73) Assignee: J.Schmalz GmbH, Glatten (DE)

( * ) Notice: Subject to any disclaimer, the term of this patent is extended or adjusted under 35 U.S.C. 154(b) by 344 days.

(21) Appl. No.: 18/609,780

(22) Filed: Mar. 19, 2024

(65) Prior Publication Data

US 2024/0351196 A1 Oct. 24, 2024

(30) Foreign Application Priority Data

Apr. 20, 2023 (DE) ..................... 10 2023 110 107.2

(51) Int. Cl.
*B25J 9/16* (2006.01)

(52) U.S. Cl.
CPC ........... *B25J 9/1612* (2013.01); *B25J 9/1638* (2013.01); *B25J 9/1664* (2013.01); *B25J 9/1697* (2013.01)

(58) Field of Classification Search
CPC ...... B25J 9/1661; B25J 9/1612; B25J 19/023; B25J 9/1697; B25J 9/1679; B25J 13/087; B25J 13/088; B25J 15/08; G05B 2219/39484; G06F 18/24; G06N 3/04; G06N 3/08
See application file for complete search history.

(56) References Cited

U.S. PATENT DOCUMENTS

| | | | | |
|---|---|---|---|---|
| 9,102,053 | B2 * | 8/2015 | Suzuki | B25J 9/1697 |
| 9,156,162 | B2 * | 10/2015 | Suzuki | B25J 9/16 |
| 9,230,329 | B2 * | 1/2016 | Lukka | G06T 7/70 |
| 9,415,511 | B2 * | 8/2016 | Gotou | B25J 9/1697 |
| 10,576,630 | B1 * | 3/2020 | Diankov | B25J 9/1612 |
| 10,981,272 | B1 * | 4/2021 | Nagarajan | B25J 9/1669 |
| 11,559,894 | B2 * | 1/2023 | Oka | B25J 9/161 |
| 11,565,408 | B2 * | 1/2023 | Jiang | G06N 3/008 |
| 11,654,564 | B2 * | 5/2023 | Fan | B25J 9/1605 700/246 |

(Continued)

FOREIGN PATENT DOCUMENTS

| | | |
|---|---|---|
| CN | 115 319 739 A | 11/2022 |
| DE | 10 2013 111 761 A1 | 4/2015 |

(Continued)

*Primary Examiner* — Robert T Nguyen
(74) *Attorney, Agent, or Firm* — ASLAN LAW, P.C.

(57) ABSTRACT

A method (for handling objects arranged in a work area) comprising carrying out a plurality of handling cycles one after the other, each handling cycle comprising capturing at least one image of the work area, determining, on the basis of the at least one image, at least one grip point candidate at which a corresponding object can be gripped with the end effector, wherein the determined grip point candidates form a set Me of grip point candidates, selecting a grip point candidate as the target grip point for the end effector, and performing a handling task comprising moving the end effector to the target grip point, wherein at least one subset Mes of the set Me is stored in a grip point memory, and at least one subset Mtes of the grip point candidates Mes stored in the grip point memory remains stored at least until the next handling cycle.

18 Claims, 4 Drawing Sheets

(56) References Cited

U.S. PATENT DOCUMENTS 11,667,034 B2 * 6/2023 Claussen .................. B25J 9/162
700/245
11,911,919 B2 * 2/2024 Moreira Rodrigues .....................
B25J 9/1697
12,350,840 B2 * 7/2025 Fan .......................... B25J 13/08
2017/0057092 A1 * 3/2017 Ito .......................... B25J 9/1679
2017/0136632 A1 * 5/2017 Wagner ..................... B07C 3/18
2019/0034727 A1 1/2019 Chihara et al.
2020/0262064 A1 8/2020 Claussen et al.
2020/0316782 A1 10/2020 Chavez et al.
2021/0138655 A1 5/2021 Mousavian et al.
2022/0161424 A1 5/2022 Guo
2022/0203547 A1 6/2022 Majumdar et al.
2022/0297294 A1 * 9/2022 Baek .................... B25J 15/0066
2022/0388162 A1 12/2022 Fan
2023/0124599 A1 4/2023 Fan
2023/0158676 A1 * 5/2023 Sun ........................ B25J 9/0084
700/248
2023/0182293 A1 * 6/2023 Shaw ................... B25J 15/0616
700/245
2023/0415348 A1 * 12/2023 Afrooze ................... B25J 9/161
2024/0198530 A1 * 6/2024 Ugalde Diaz .......... B25J 9/1679
2024/0351214 A1 * 10/2024 Frey ......................... B25J 9/163

FOREIGN PATENT DOCUMENTS

DE 10 2020 128 653 A1 5/2021
DE 10 2020 214 633 A1 5/2022
DE 11 2019 007 852 T5 7/2022
DE 10 2022 107 227 A1 12/2022
DE 10 2022 122 818 A1 4/2023
DE 11 2021 005 493 T5 8/2023
DE 10 2023 110 107 B3 10/2024

* cited by examiner

METHOD FOR HANDLING OBJECTS AND HANDLING SYSTEM

CROSS-REFERENCE TO RELATED APPLICATIONS

This application claims priority to DE Patent Application No. 10 2023 110 107.2 filed on Apr. 20, 2023, the entire contents of which are hereby incorporated by reference.

The invention relates to a method for handling objects and a handling system designed therefor.

Handling systems are used, for example, when picking goods in warehouses, where they are used in particular to pick goods items out of a storage container (source container) having a plurality of goods items (so-called "bin-picking") and to move them to another location, e.g., into a transport container (target container). Such handling systems usually comprise a robot with a robot arm on which an end effector for gripping an object is arranged.

In this context, it is known to first capture an image of the source container and the objects contained therein and from this to ascertain, in terms of data, grip points at which the end effector can grip the objects. One of the grip points ascertained is then selected. The robot then moves to this grip point with its end effector, grips the corresponding object and moves it to a deposition location in the target container.

In the application situation described above, the robot usually carries out the steps described above repeatedly in order to successively transfer a plurality of objects from the source container into the target container. A plurality of handling cycles are thus carried out one after the other. However, in this serial procedure undesired robot idle times can occur, since in each cycle the robot has to wait for the result of grip point ascertainment before it can start a handling task. This is disadvantageous in particular when the robot dynamics are very fast.

The object of the invention is to accelerate a handling process. In particular, objects are to be capable of being gripped with high gripping performance and being transferred between two locations.

This task is achieved by a method having the features of claim 1. The method is a method for handling objects by means of a handling system, for example for picking objects. In particular, the method is a method for handling objects arranged in a work area, in particular in a source container, by means of a handling system.

The handling system comprises at least one robot, for example a multi-axis robot, a SCARA robot, or a collaborative lightweight robot (cobot). An end effector for gripping an object is arranged on the at least one robot. In particular, the robot is designed to move the end effector and, optionally, objects gripped by it. The end effector can in particular be a suction gripper device.

The handling system also comprises a detection device or recognition device for capturing the work area and in particular the objects arranged therein. The detection device comprises at least one acquisition unit which is designed to capture the work area, in particular the source container, and in particular the objects arranged therein, by means of an imaging method. In this respect, the at least one acquisition unit is designed in particular to record at least one image, in particular a 3D image, of the work area. The at least one acquisition unit is preferably designed as a camera, in particular a 3D camera, e.g. a CCD camera. It is also conceivable for the at least one acquisition unit to be a laser scanner, ultrasonic sensor or radar sensor. It is also conceivable for the detection device to comprise a plurality of acquisition units of different types. The detection device can also be set up to capture an image of a target area, in particular a target container. In this respect, the detection device can have at least one acquisition unit, in particular a camera, which is designed to capture an image of the target area. The detection device can be mounted on the robot, in particular a robot arm of the robot. The detection device can also be provided separately from the robot. In particular, the detection device can be arranged in a fixed position relative to the work area, in particular the source container.

The handling system also comprises a control device for controlling the handling system, in particular for controlling the at least one robot and/or the detection device. The control device comprises a data processing system and a non-volatile memory device.

The handling system can also comprise the above-mentioned work area, in particular the source container. In particular, a plurality of objects can be provided in the work area, in particular in the source container, in particular accommodated therein. In this respect, the handling system can comprise a work area with a plurality of objects arranged therein. The handling system can also comprise a target area, in particular target container, for receiving objects. It is conceivable that the target container is empty at the beginning of a handling process. It is also conceivable that the target container is already partially filled, for example with objects, at the beginning of a handling process. In particular, the source container can be a storage container and the target container can be a transport container, e.g., a parcel box.

The method comprises carrying out a plurality of handling cycles in temporal succession.

Each handling cycle comprises the following steps:

a) Acquiring, in particular recording, at least one image, in particular a 3D image, of the work area, in particular of the source container, by means of the detection device or the at least one acquisition unit. In particular, an image is captured of at least a subset of the objects arranged in the work area. As mentioned above, the acquisition unit can be designed as a camera, in particular a 3D camera, for example as a CCD camera. Capturing the at least one image may then comprise recording one or more optical images of the work area and of the objects arranged therein. It is also conceivable that the capturing of the at least one image of the work area comprises the scanning of the work area and of the objects arranged therein, for example by means of a laser scanner, an ultrasonic sensor and/or a radar sensor. It is also conceivable that the capturing of the at least one image of the work area comprises the simultaneous or sequential capture of an image of the work area by means of a plurality of different acquisition units.

b) For at least a subset of the objects arranged in the work area, in particular for the objects previously captured in an image: in each case determining at least one grip point candidate at which the object can be gripped with the end effector. In the present context, "grip point candidate" refers in particular to a possible grip point at which an object can be gripped by means of the end effector. A grip point or grip point candidate can in particular be formed by a portion of an outer surface of an object. As explained below, this does not yet mean that the object is actually gripped at this grip point candidate. The grip point candidates are determined on the basis of the at least one image of the work area which was previously captured by the detection device.

In particular, image data that represent the at least one image of the work area are analyzed. As explained below, the grip point candidates are preferably determined by means of image processing methods. The grip point candidates determined in a corresponding handling cycle form a set $M_e$ of grip point candidates. It is conceivable that a plurality of grip point candidates are determined for one object. It is also conceivable that only a single grip point candidate is determined for an object. It is conceivable that grip point candidates are determined for only a subset of the objects that are arranged in the work area or that can even be detected (e.g. because a subset of the objects accommodated in the work area cannot initially be captured by the detection device, e.g. because these objects are occluded by other objects).

c) Selecting, by means of the data processing system, a candidate grip point as the target grip point for the end effector of the at least one robot. In the present context "target grip point" refers in particular to a grip point that the at least one robot is to actually approach with the end effector. The target grip point is preferably selected through calculation by means of the data processing system. In particular, a grip point candidate is selected as the target grip point under predefined or prespecifiable boundary conditions (see below).

d) Performing a handling task by means of the handling system, in particular by means of the at least one robot. Performing the handling task includes, in particular, moving the end effector up to the target grip point selected for it. In this respect, the at least one robot is controlled by means of the control device in particular such that the robot moves the end effector up to the target grip point selected for it. Preferably, the performance of the handling task also comprises gripping the corresponding object by means of the end effector at the target grip point, moving the gripped object by means of the robot to a target area and depositing the gripped object at a target deposition location of the target area.

According to the proposed method, at least one subset $M_{es}$ of the set $M_e$ of determined grip point candidates is stored in a grip point memory of the non-volatile memory device of the control device. The grip point memory can already comprise grip point candidates from a previous handling cycle. In this respect, storing the grip point candidates in a handling cycle can comprise adding these grip point candidates to a set of already stored grip point candidates.

According to the method, at least a subset $M_{tes}$ of the grip point candidates $M_{es}$ stored in the grip point memory in the context of a handling cycle remains stored in the grip point memory at least until the start of the next handling cycle, preferably until a grip point candidate is selected as the target grip point in the next handling cycle. The grip point candidates stored in a handling cycle are therefore in particular not deleted after a grip point candidate has been selected as the target grip point in this handling cycle, but remain at least partially in the grip point memory until the following handling cycle.

According to the method, the target grip point is selected from a set $M_s$ of grip point candidates stored in the grip point memory. In particular, the set $M_s$ comprises at least the subset $M_{tes}$ of the grip point candidates determined in a previous handling cycle.

The proposed method makes it possible to efficiently pick up objects from a work area with high gripping performance and, in particular, to move them to a target area. Because the grip point candidates determined in a handling cycle are stored and remain stored at least partially until the next handling cycle, the robot can access these grip point candidates in a subsequent handling cycle. The robot therefore does not necessarily have to wait for the result of a renewed determination of the grip point candidates, but can be controlled on the basis of already determined grip point candidates from a previous handling cycle. In this way, robot idle times can be reduced. In addition, the proposed storing of the grip point candidates makes it possible to prioritize them according to predefined criteria and to validate newly determined grip point candidates on the basis of the stored grip point candidates (see below).

It can be particularly advantageous if the capturing of the at least one image of the work area by means of the detection device and/or the determination of the grip point candidates takes place overlapping in time with the performance of the handling task by the at least one robot. In this respect, the detection of the at least one image of the work area and/or the determination of the grip point candidates can take place during a movement of the robot, in particular during a movement of the robot to a target grip point and/or to a target deposition location. The capturing of the at least one image of the work area and/or the determination of the grip point candidates can therefore take place in parallel, and not sequentially as in the prior art. This is made possible in particular by the fact that the robot, as mentioned above, does not necessarily have to wait for the result of a grip point determination, but can access the set $M_s$ of grip point candidates stored in the grip point memory.

A grip point candidate can be characterized in particular by its coordinates (X, Y, Z) and/or its orientation (A, B, C) in a coordinate system of the handling system. In particular, two grip point candidates can be identified as identical when they match in their coordinates and/or their orientation, or when a deviation in one or more of the coordinates or orientation is less than a predefined threshold value. In other words, two grip point candidates can be identified as different when a difference in one or more of the coordinates or orientations is greater than a predefined threshold value.

In addition, a grip point candidate can include or be characterized by information about the corresponding object. In particular, a grip point candidate can include information about the geometry of the object and/or a position of the object in the work area. In particular, a grip point candidate can include information about an outer surface of the corresponding object, e.g. its coordinates in a coordinate system of the handling system. This makes a segmentation of the work area possible. In particular, the determination of the grip point candidates can comprise the determination of an outer surface of the objects to be gripped, in particular the determination of the coordinates of the outer surface in a coordinate system of the handling system or the coordinates of an envelope describing the outer surface, on the basis of the at least one image of the work area.

In the context of an advantageous development, it is conceivable that a storage criterion or a plurality of storage criteria are specified and, of the set $M_e$ of determined grip point candidates, only those grip point candidates are stored in the grip point memory of the non-volatile memory device which satisfy the specified storage criterion or at least one or all of the plurality of specified storage criteria. These grip point candidates can then form the above-mentioned subset $M_{es}$.

By way of example, the method can comprise the following additional steps, in particular per handling cycle:

specifying a storage criterion or a plurality of storage criteria;

checking whether the determined grip point candidates $M_e$ satisfy the storage criterion or at least one or all of the plurality of storage criteria;

storing in the grip point memory only those grip point candidates in the set $M_e$ of determined grip point candidates which satisfy the specified storage criterion or at least one or all of the plurality of storage criteria.

In particular, discarding those grip point candidates in the set $M_e$ of determined grip point candidates which do not satisfy the storage criterion or do not satisfy any of the plurality of storage criteria.

According to the method, it is thus conceivable that only a subset of the grip point candidates determined in a handling cycle are actually stored in the grip point memory. In this way, for example a selection can be made of those grip point candidates that make an efficient handling cycle possible.

Preferably, the storage criterion is one of the following storage criteria, or the plurality of predefined storage criteria comprise one or more of the following storage criteria:

Grip point candidate has not yet been stored in the grip point memory. In this respect, for each grip point candidate in the set $M_e$ of determined grip point candidates it can be checked whether this grip point candidate has already been stored in the grip point memory, for example during a previous handling cycle. If a grip point candidate has already been saved in the grip point memory, this does not necessarily mean that this grip point candidate is still stored in the grip point memory. As explained below, it may also be the case that this grip point candidate has already been removed from the grip point memory on the basis of specified discard criteria.

Grip point candidate has not yet been selected as a target grip point. In this respect, for each grip point candidate in the set $M_e$ of determined grip point candidates it can be checked whether this grip point candidate was already selected as a target grip point in a previous handling cycle. This can prevent the robot from reaching "into the void." As explained below, it is in particular conceivable that grip point candidates already selected as target grip points are removed from the grip point memory and transferred to a target grip point memory of the storage device. The grip candidates stored in the target grip point memory can in particular form a set $M_z$ of grip point candidates already selected as target grip points. The check as to whether the grip point candidates determined in a handling cycle have already been selected as target grip points can, in particular, comprise comparing the set $M_e$ of determined grip point candidates with the set $M_z$ of grip point candidates already selected as target grip points.

Grip point candidate lies within or outside a specified distance from grip point candidates already stored in the grip point memory. In this way, a plausibility check can be carried out, for example in order to reject incorrectly calculated grip point candidates or not to save them in the first place.

Grip point candidate lies within or outside a specified distance from one or more grip point candidates already selected as the target grip point, in particular within a specified distance from the last grip point candidate selected as the target grip point or the last n grip point candidates selected as the target grip point (where n is a natural number). A plausibility check can also be made in this way. In addition, a gripping strategy can be optimized by, for example, preferably storing those grip point candidates that are located far away from each other. It is also conceivable that preferably those grip point candidates are stored that are located close to each other.

As mentioned above, the grip point candidates can be characterized by their coordinates and their orientation in a coordinate system of the handling system. The check as to whether a grip point candidate has not yet been selected as a target grip point or whether a grip point candidate is not yet present in the grip point memory can then comprise comparing the coordinates and orientation of a newly determined grip point candidate with the coordinates and orientation of the grip point candidates already stored in the grip point memory.

A distance between two grip point candidates can in particular be determined from a difference in the coordinates of the grip point candidates. For example, the distance can be the length of a connecting vector between two grip point candidates. As mentioned above, a grip point candidate can also comprise information about the corresponding object. It is then also conceivable for the distance of a first grip point candidate from a second grip point candidate to be the minimum distance of the first grip point candidate from an outer surface of the object of the second grip point candidate, e.g. the length of a corresponding connecting vector from the first grip point candidate to the outer surface. In this way, for example grip point candidates in the set $M_e$ of determined grip point candidates can be rejected or not even stored in the first place if they are located too close to a neighboring object, e.g. so close that an undesired collision of the end effector with the neighboring object would occur when the end effector approaches the grip point candidate.

It is also conceivable that a rejection criterion is specified or a plurality of rejection criteria are specified, wherein, in the set $M_e$ of determined grip point candidates, only those grip point candidates are stored in the grip point memory that do not satisfy the rejection criterion, or do not satisfy any of the several specified rejection criteria. The rejection criterion can for example be one of the following rejection criteria, or the plurality of rejection criteria can comprise one or more of the following rejection criteria:

Grip point candidate has already been selected as the target grip point.

Grip point candidate has already been stored in the grip point memory (grip point candidate may still be part of the set $M_s$ of the grip points stored in the grip point memory). It is also conceivable for the grip point candidate to already have been removed from the grip point memory).

Grip point candidate lies outside or within a specified distance from grip point candidates already stored in the grip point memory.

Grip point candidate lies outside or within a specified distance from one or more grip point candidates already selected as the target grip point, in particular within a specified distance from the last grip point candidate selected as the target grip point or the last n grip point candidates selected as the target grip point.

The grip point candidates can be permanently stored in the grip point memory. Preferably, however, the grip point candidates are removed from the grip point memory if, in particular only if, they satisfy a specified discard criterion or at least one or all of a plurality of specified discard criteria.

This makes it possible to continuously update the grip point candidates stored in the grip point memory (from which a target grip point is selected) and to keep them up to date. In particular, grip point candidates that are no longer available can be removed, for example because they have already been selected as target grip point or because a corresponding object has moved (e.g. as a result of a gripping operation previously carried out).

In particular, the method, in particular in each handling cycle, can additionally comprise the following steps:

- specifying a discard criterion or a plurality of discard criteria;
- checking, in particular continuously or regularly at specified intervals, for example after each handling cycle, whether the grip point candidates stored in the grip point memory satisfy the specified discard criterion or at least one or all of the plurality of specified discard criteria;
- removing, from the set $M_s$ of the grip point candidates stored in the grip point memory, those grip point candidates which satisfy the specified discard criterion or at least one or all of the plurality of specified discard criteria.

It is possible for the removal of a grip point candidate from the grip point memory to comprise deleting this user point candidate from the non-volatile memory device. It is also conceivable for the removal of a grip point candidate from the grip point memory to comprise moving the candidate from the grip point memory to another memory location of the storage device.

The specified discard criterion can for example be one of the following discard criteria, or the plurality of specified discard criteria can comprise one or more of the following discard criteria:

- Grip point candidate has already been selected as the target grip point.
- Grip point candidate has already been stored in the grip point memory for longer than a specified dwell time, in particular a specified number of handling cycles. In this way, "older" grip point candidates can be removed from the grip point memory. As explained in more detail below, the grip point candidates can preferably be sorted in a ranking list and the grip point candidates at the top of the ranking list can preferably be selected. In this case, the "older" grip point candidates can in particular be non-preferred grip points. Discarding these non-preferred grip points further contributes to increased efficiency of the handling process.
- Grip point candidate was no longer determined in a subsequent handling cycle. In this respect, the set $M_s$ of grip point candidates stored in the grip point memory can be compared in each handling cycle with the set $M_e$ of grip point candidates determined in this handling cycle, and those grip point candidates that are no longer present in the set $M_e$ of determined candidates can be removed from the set $M_s$ or from the grip point memory. In this way, the risk can be further reduced of the robot reaching "into the void" because a grip point candidate still in the grip point memory is no longer available (for example, because the corresponding object has slipped or tipped over as a result of a handling operation previously carried out).

As already mentioned above, the selection of a grip point candidate from the set $M_s$ of grip point candidates stored in the grip point memory as the target grip point takes place under one or more boundary conditions. In this respect, a boundary condition or a plurality of boundary conditions can be specified, depending on which a grip point candidate is selected from the set $M_s$ of the grip point candidates stored in the grip point memory as the target grip point.

The boundary condition can be one of the following boundary conditions, or the plurality of boundary conditions can comprise one or more of the following boundary conditions:

- Approach time of the robot to the grip point candidate starting from a current position of the robot. In this respect, the selection of a grip point candidate as a target grip point can take place as a function of how long the robot needs for a relocation movement of the end effector to a grip point candidate starting from a current position. In particular, from the set $M_s$ of grip point candidates that grip point candidate for which the approach time of the robot is minimal can be selected as the next target grip point.
- Distance of the grip point candidate from a current position of the end effector of the at least one robot. In this respect, the selection of a grip point candidate as a target grip point can take place depending on how far a grip point candidate is removed from a current position of the end effector. In particular, from the set $M_s$, the grip point candidate that has the shortest distance from the end effector can be selected as the next target grip point.
- Distance of the grip point candidate from the last grip point candidate, or the last n grip point candidates, selected as target grip points. In this respect, the selection of a grip point candidate as a target grip point can be made depending on how far a grip point candidate lies from the last 1 to n grip point candidates selected as target grip point. In particular, a grip point candidate can preferably be selected as the next target grip point if a distance between this grip point candidate and the last grip point candidate selected as the target grip point is greater than a specified threshold value, in particular is maximal. This can minimize the risk that the now-selected grip point candidate is no longer available, for example because the object has slipped or tipped over during the handling process previously carried out. It is also conceivable that a grip point candidate is preferably selected as the target grip point when the distance from the last target grip point is minimal.
- Grip point candidate lies on a predefined movement path of the robot within the work area (depalletization according to a predefined sequence).

In an advantageous further development, the grip point candidates stored in the grip point memory can be evaluated by means of the data processing system and sorted in a ranking list depending on the evaluation. It is then conceivable that the selection of a grip point candidate from the set $M_s$ of grip point candidates as the target grip point is made depending on a position of the grip point candidate in the ranking list. In particular, the highest (best) rated grip point candidate, in particular the highest in the ranking list, can be selected as the next target grip point. Such a design makes it possible to prioritize grip point candidates and thus to further improve the efficiency of the handling process.

In particular, the evaluation of the grip point candidates stored in the grip point memory can take place on the basis of one or more of the following evaluation criteria.

- Number of the repeated determination of the grip point candidate in the context of successive handling cycles. In this respect, a grip point candidate can be evaluated depending on how often the grip point candidate was determined in successive handling cycles. In particular, a larger number of repeated determinations can give a better evaluation, in particular a higher position in the ranking list.

Distance of the grip point candidate from the last 1 to n grip point candidates selected as target grip points (where n is a natural number). In particular, grip point candidates can better rated, i.e. prioritized higher, if a distance from the grip point candidate to the last grip point candidate selected as target grip point is greater than a specified threshold value, in particular is maximal. This can further minimize the risk that a grip point candidate selected as the next target grip point is no longer available, for example because the object has slipped or tipped over during the handling process previously carried out. It is also conceivable in principle that a grip point candidate is prioritized higher when the distance from the last target grip point is minimal.

Dwell time of the grip point candidate in the grip point memory has already elapsed. In this respect, a grip point candidate can be evaluated depending on how long a grip point candidate has already been stored in the grip point memory. In particular, grip point candidates can be rated better, i.e. prioritized higher, when a dwell time is comparatively short (i.e. they are relatively "new").

Position (coordinates) and/or orientation of the grip point candidate in a coordinate system of the handling system. As mentioned above, grip point candidates can for example be rated better, i.e. prioritized higher, when they lie one after the other along a predefined movement path of the robot in the work area. In this way, for example an ordered emptying of the work area according to a predefined pattern is made possible (depalletizing strategy).

It is conceivable that an evaluation of the grip point candidates takes place only on the basis of a single evaluation criterion. It is also conceivable that an evaluation of the grip point candidates takes place on the basis of a plurality of evaluation criteria. In the latter case, it can be possible for the evaluation criteria, or at least a subset of the plurality of evaluation criteria, to be differently weighted. In particular, the weighting of the evaluation criteria can be variable, in particular adjustable. In this way, a handling strategy can be influenced.

In an advantageous further development, the handling system can comprise a plurality of different end effectors, which can be optionally coupled to the at least one robot. For example, the handling system can have suction grippers of different sizes or of different designs. In this context, it can be advantageous if the determination of the grip point candidates includes the determination of a preferred end effector for gripping the corresponding object at this grip point candidate. In this respect, for each grip point candidate it can be determined which of the plurality of end effectors can best grip the corresponding object. The execution of the handling task can then comprise the provision on the at least one robot of the end effector which is preferred for the grip point candidate selected as target grip point. It is conceivable that this end effector is already provided on the robot (for example because the same end effector was previously determined as preferred in a handling cycle). It is also conceivable that the performance of the handling task comprises the exchanging of the end effector, in particular in automated fashion.

The determination of the preferred end effector for a grip point candidate can take place for example as a function of one or more of the following boundary conditions:

Coordinates (position) and/or orientation of the grip point candidate in a coordinate system of the handling system. For example, it is conceivable that a smaller end effector is preferred for objects arranged in a corner region of the work area or source container.

Weight of the object to be gripped. In particular, an end effector can be selected which provides the required gripping force.

Nature of the surface of the object.

The determination of the set $M_e$ of grip point candidates preferably comprises analyzing the at least one image of the work area by means of at least one evaluation algorithm (computer program) running on the data processing system. The at least one evaluation algorithm can in particular comprise methods of image processing. Such evaluation algorithms are known in principle from the prior art.

In an advantageous further development, the determination of the set $M_e$ of grip point candidates can comprise the analysis, in particular in parallel, of the at least one image of the work area by means of different evaluation algorithms running on the data processing system. In this way, it is possible to compensate for the weaknesses of one algorithm with the strengths of another algorithm. For example, it is conceivable for evaluation algorithms of different speeds and/or different levels of precision to run in parallel. In this way, a first grip point candidate can be provided particularly quickly, for example, so that the robot can begin carrying out the handling task. The slower but possibly more precise evaluation algorithms can then deliver further grip point candidates, while the robot is already carrying out the one first handling task.

In particular, each of these evaluation algorithms can determine a subset $M_t$ of grip point candidates. A sum of the subsets $M_t$ can then form the set $M_e$ of determined grip point candidates. It is conceivable that the subsets have overlapping content, i.e. the evaluation algorithms partly determine the same grip point candidates. Such a multiply determined grip point candidate is then in particular stored only once in the grip point memory. In particular, the determination of a grip point candidate by means of a plurality of evaluation algorithms can form a further evaluation criterion for evaluating or prioritizing grip point candidates.

As mentioned above, the evaluation algorithms can have different speeds. In this respect, the determination of the subsets $M_t$ can end at different points in time.

In an advantageous further development, the detection device can comprise a plurality of acquisition units. The acquisition units can in each case be designed to capture an image of the work area. In this context, it can be advantageous if the capture of the at least one image of the work area comprises the in particular simultaneous capture of at least one image of the work area by each of the individual acquisition units. In this respect, the acquisition units can each capture at least one image of the work area in parallel.

It is conceivable that the images of the acquisition units are analyzed by the same evaluation algorithm. It is also conceivable that the images of the different acquisition units are also analyzed by different evaluation algorithms.

In some embodiments, the handling system can comprise a plurality of robots. A separate target grip point can then be selected for each end effector from the set $M_s$ of grip point candidates stored in the grip point memory. In other words, the robots can each be assigned target grip points from a common "pool" of grip point candidates. Performing the handling task can then comprise moving a corresponding end effector to the target grip point selected for it.

As mentioned above, performing the handling task can also involve moving an object gripped at the target grip point to a target deposition location in a target area, in particular a target container. In particular, the handling system can also comprise a target area, in particular a target container, for receiving objects. The detection device can then preferably comprise at least one acquisition unit, in particular a camera, which is designed to capture an image of the target area, in particular the target container, and optionally of objects already accommodated therein. It is conceivable for the work area and the target area to be captured by means of the same at least one acquisition unit. It is also conceivable for at least one separate acquisition unit to be provided in each case for the work area and the target area.

A handling cycle may also comprise:

capturing at least one image of the target area by means of the detection device;

determining, on the basis of the at least one image of the target area, one or more deposition location candidates at which an object can be deposited. The determined deposition location candidates in particular form a set $M_a$.

Storing at least one subset $M_{as}$ of the deposition location candidates of the set $M_a$ of deposition location candidates in a deposition location memory of the non-volatile memory device.

Selecting, by means of the data processing system, a deposition location candidate from a set $M_{sa}$ of deposition location candidates stored in the deposition location memory as target deposition location for an object, in particular the object that is being gripped or is to be gripped. The set $M_{sa}$ of deposition location candidates stored in the deposition location memory includes in particular the subset $M_{as}$.

The advantages and features described above with respect to the determining, storing, and discarding of the grip point candidates can be used in an analogous manner in the realization of the determining, storing, and discarding of deposition location candidates. In this respect, storage criteria and/or discard criteria can be specified for the deposition location candidates. In particular, the determination of the deposition location candidates comprises analyzing the at least one image of the target area by means of at least one evaluation algorithm running on the data processing system.

In principle, it is also conceivable that in a particular handling cycle only deposition location candidates are determined and stored but not the above-described grip point candidates.

The object mentioned above is also achieved by a handling system which is designed to carry out one of the methods described above. In this respect, the handling system is designed for handling objects arranged in a work area. The handling system comprises at least one robot on which an end effector for gripping an object is arranged. The handling system also comprises a detection device comprising at least one acquisition unit, in particular a camera, which is designed to capture an image of the work area, in particular the source container, and/or a target area, in particular a target container. The handling system also comprises a control device for controlling the handling system, in particular for controlling the robot and/or the detection device. The control device comprises a data processing system and a non-volatile memory device.

The control device is designed to carry out one of the methods described above. In this respect, control instructions or commands which, when executed on the data processing system of the control device, cause it to carry out one of the methods described above are stored in the non-volatile memory device.

The handling system can also comprise the above-mentioned work area. In particular, the handling system can comprise a work area with a plurality of objects arranged therein. The handling system can also comprise the above-described target area, in particular target container.

The advantages and optional features described above in connection with the method can also be used in the realization of the handling system, so that reference is made to the above disclosure in this respect in order to avoid repetition.

The invention is explained in more detail below with reference to the figures. In the drawings.

In the following description and in the figures, identical reference signs are in each case used for identical or corresponding features.

Figure 1:
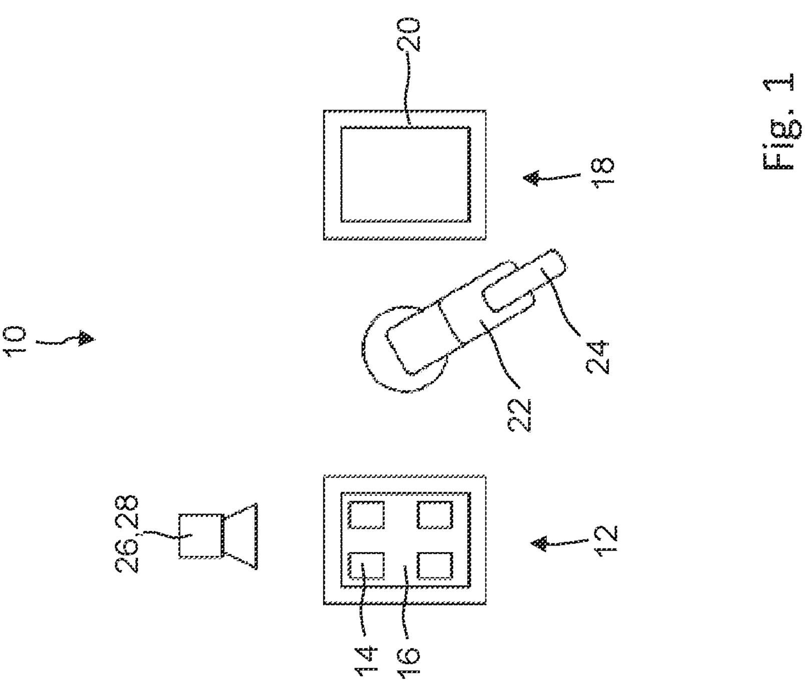
FIG. 1 is a simplified schematic representation of an embodiment of a handling system in a plan view.

FIG. 1 shows, in a simplified schematic representation, an embodiment of a handling system, which is denoted as a whole by reference sign 10.

In the example, the handling system 10 comprises a work area 12 in which a plurality of objects 14 are arranged. In the specific example, the work area 12 is formed by a source container 16 in which the objects 14 are accommodated.

In the example, the handling system 10 also comprises a target area 18 into which the objects 14 are to be transferred in a handling process described below. In the example, the target area 18 is formed by a target container 20 for accommodating the objects 14.

The handling system 10 also comprises a robot 22. The robot 22 is designed as an industrial robot by way of example. As mentioned above, the robot 22 can for example be designed as a multi-axis robot, a SCARA robot, or a collaborative robot. However, any other design of the robot 22 is also conceivable.

The robot 22 is designed to transfer objects 14 from the work area 12 (source container 16) into the target area 18 (target container 20).

An end effector 24 for gripping an object 14 is arranged on the robot 22. By way of example, the end effector 24 can be a suction gripper.

The handling system 10 also comprises a detection device 26 which is designed to detect the work area 12 (source container 16). In the specific example, the detection device 26 comprises an acquisition unit 28, in particular a camera, which is designed to capture an image of the work area 12 and the objects 14 arranged therein. In embodiments (not shown), it is also conceivable for the detection device 26 to have a further acquisition unit 28 which is designed to capture an image of the target area 18, in particular the target container 20.

The handling system 10 also comprises a control device (not shown) which is designed to control the robot 22 and the detection device 26. As mentioned above, the storage device comprises a data processing system and a non-volatile memory device.

Figure 2:
FIG. 2 is a simplified schematic representation of a further embodiment of a handling system in a plan view.
Figure 2:
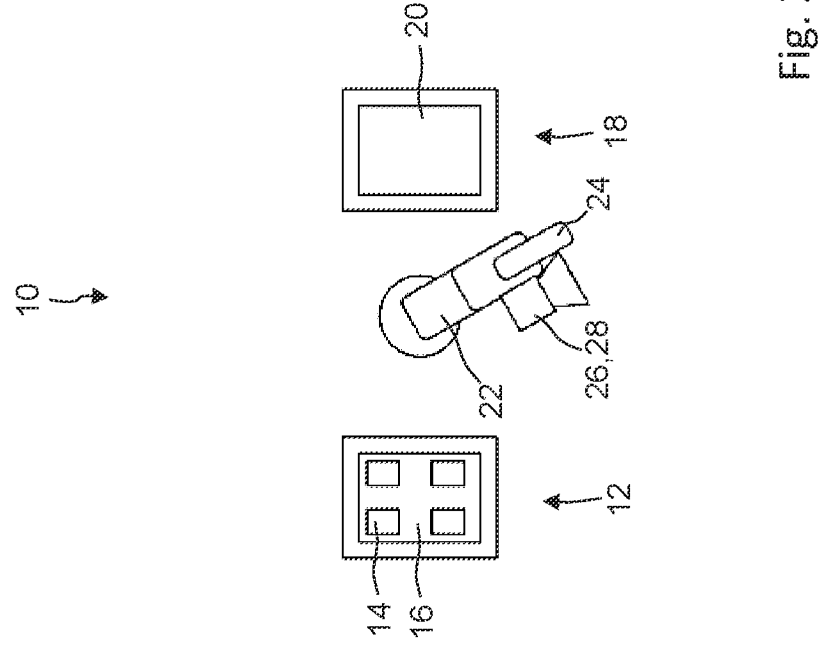

FIG. 2 shows a further exemplary embodiment of a handling system 10 which differs from the embodiment shown in FIG. 1 only in that the detection device 26 or the acquisition unit 28 is mounted on the robot 22 and can thus be moved by the robot 22. In this way, the acquisition unit 28 can capture not only the work area 12 (source container 16) (in particular when the robot 22 is facing the work area 12) but also the target area 18 (target container 20) (in particular when the robot 22 is facing the target area 18). Otherwise, the embodiment of the handling system 10 according to FIG. 2 substantially corresponds to the embodiment according to FIG. 1, so that reference is made to the above description in order to avoid repetition.

Figure 3:
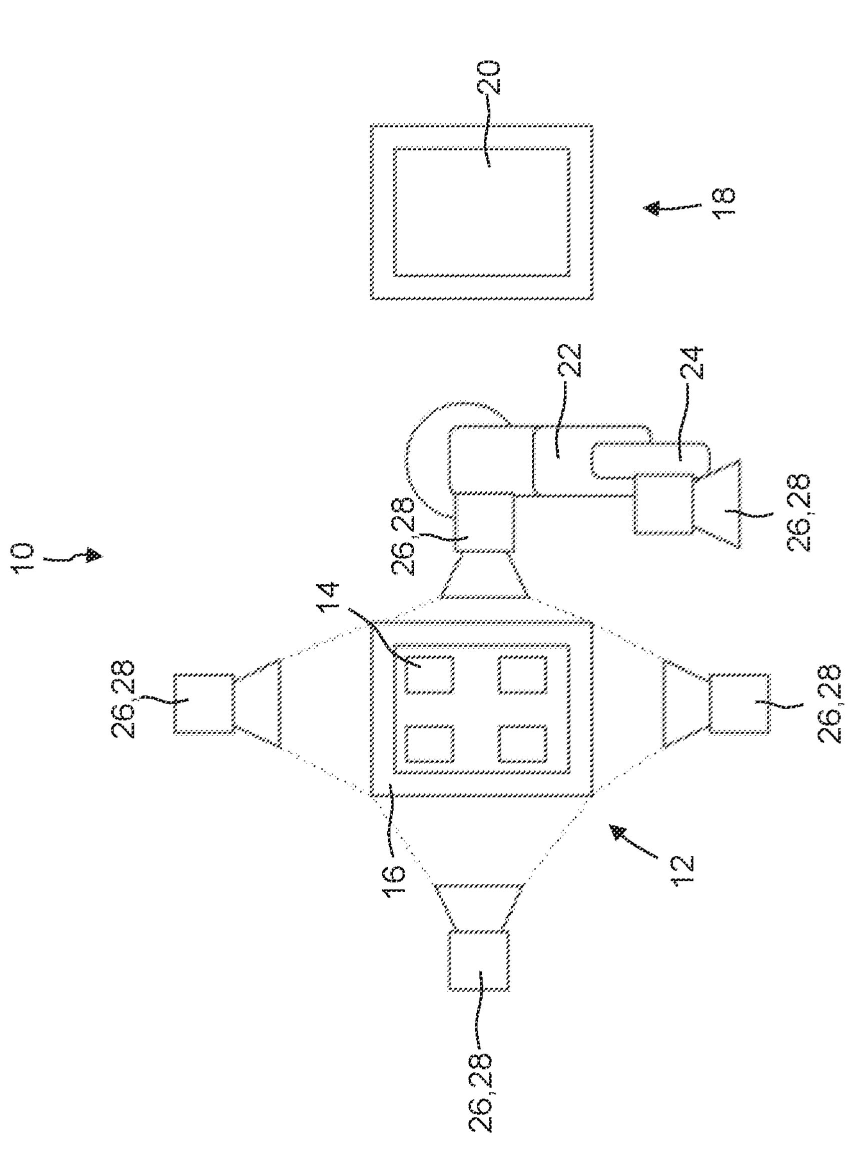
FIG. 3 is a simplified schematic representation of a further embodiment of the handling system in a plan view.

FIG. 3 shows a further exemplary embodiment of a handling system 10, which differs from the handling system 10 shown in FIG. 2 only in that the detection device 26 has a plurality of acquisition units 28. In the specific example, in addition to the acquisition unit 28 shown in FIG. 2, the detection device 26 comprises further, in particular stationary, acquisition units 28 which are designed to capture an image of the work area 12. In embodiments (not shown), it is also conceivable for the detection device 26 to additionally or alternatively comprise a plurality of acquisition units 28 which are designed to capture an image of the target area 18 (target container 20). Otherwise, the embodiment of the handling system 10 according to FIG. 3 corresponds to the embodiment according to FIG. 2, so that reference is made to the above description in order to avoid repetition.

In the following, an exemplary method for operating the handling system is described with reference to FIGS. 4 and 5.

According to the method, the objects 14 are transferred one after the other from the work area 12 (source container 16) into the target area 18 (target container 20). For this purpose, the robot 22 performs a plurality of handling tasks, each of which comprises moving the end effector 24 to an object 14 to be gripped in the work area 12, gripping this object 14, transferring the object 14 to the target area 18 and depositing the object 14 at a target deposition location in the target area 18.

As mentioned above, the end effector 24 grips the objects 14 in each case at a grip point which was previously selected by means of the control device.

Specifically, in each handling cycle a target grip point is selected from a set $M_s$ of grip point candidates stored in a grip point memory of the non-volatile memory device. The robot 22 is then controlled on the basis of the selected target grip point so that it moves the end effector 24 to the target grip point.

The grip point memory is updated in particular in each handling cycle by adding newly determined or updated grip point candidates and optionally removing previously stored grip point candidates. Specifically, in each handling cycle, at least one image of the work area 12 and of the objects 14 accommodated therein is recorded by means of the at least one acquisition unit 28. This at least one image is then analyzed by means of the control device and potential grip points on the objects 14 (so-called grip point candidates) are determined. For this purpose, the at least one image is analyzed by means of an evaluation algorithm running on the data processing system of the storage device. The grip point candidates thus determined in a handling cycle form a set $M_e$ of determined grip point candidates.

The set $M_e$ of determined grip point candidates can then be stored in the grip point memory. Preferably, however, only those grip point candidates from the set $M_e$ are stored in the grip point memory which satisfy a predefined storage criterion or at least one of a plurality of predefined storage criteria. In this respect, in an optional further step of the method, for each grip point candidate from the set $M_e$ of determined grip point candidates, it can be checked whether this grip point candidate satisfies the predefined storage criterion or at least one or all of a plurality of specified storage criteria. If this is the case, this grip point candidate is stored in the grip point memory of the non-volatile memory device. If this is not the case, this grip point candidate is in particular discarded, in particular is not stored.

As mentioned above, it can, for example, be checked whether a newly determined grip point candidate has already been stored previously in the grip point memory and/or has previously been selected as the target grip point.

As mentioned above, it can also be checked in each handling cycle, or also continuously, whether the grip point candidates stored in the grip point memory satisfy a specified discard criterion or one or more of a plurality of specified discard criteria. If this is the case, this grip point candidate is removed from the grip point memory.

The method outlined above is explained in detail below on the basis of an exemplary application situation with reference to FIG. 4. FIG. 4 schematically visualizes the individual method steps of an exemplary handling process comprising a first handling cycle 30 and a second, subsequent handling cycle 32. In the example, the first handling cycle 30 is the very first handling cycle of a plurality of handling cycles.

Figure 4:
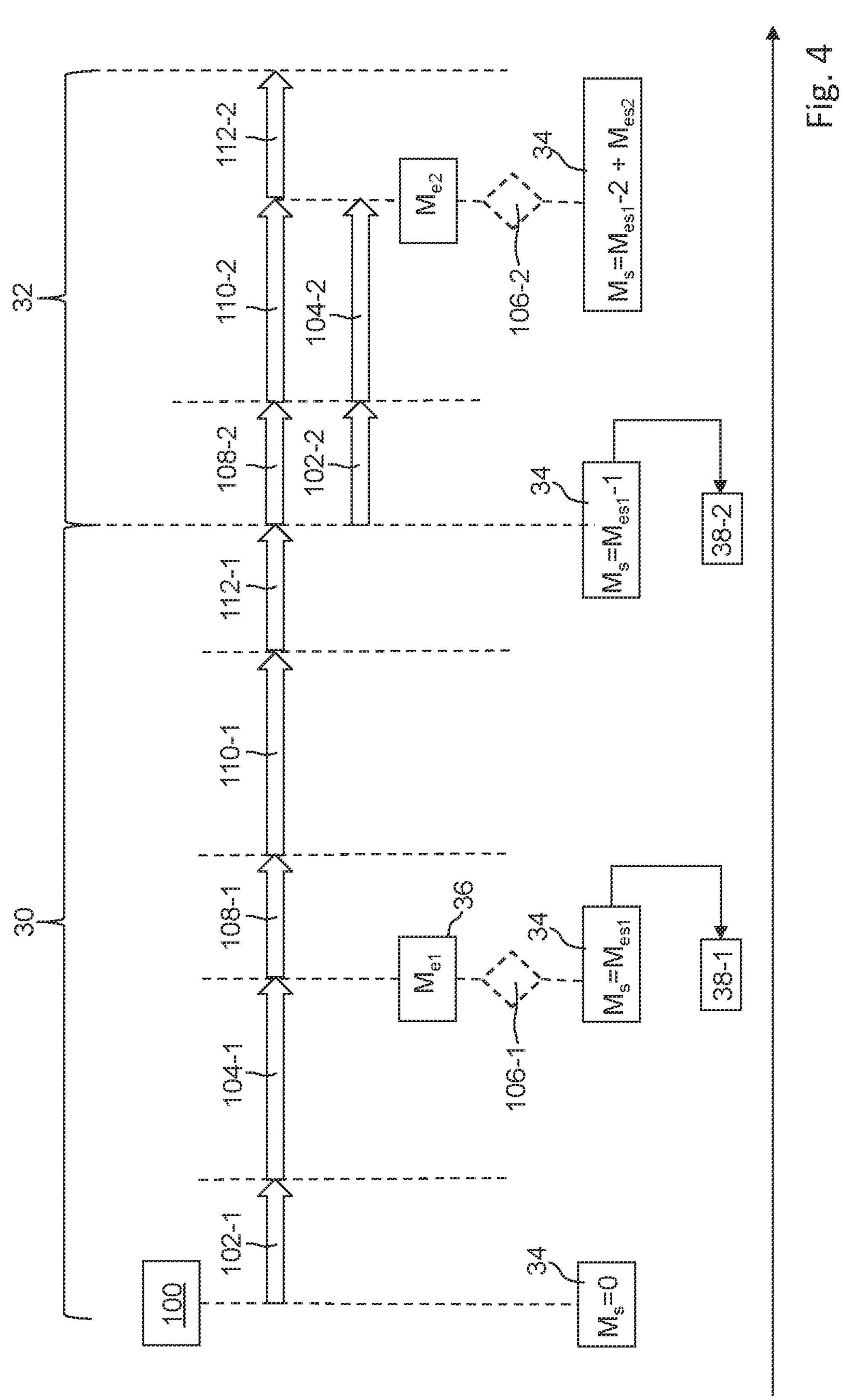
FIG. 4 is a diagram for explaining an exemplary method for operating the handling system.

The grip point memory is visualized in the bottom line of FIG. 4 by the box marked with reference sign 34.

In an initial configuration 100, the robot 22 is in an initial position in which the acquisition unit 28 can capture an image of the work area 12. In one embodiment of the handling system 10 according to FIG. 1, the robot 22 can be located for example in an intermediate position between the work area 12 and the target area 18 (see FIG. 1). In one embodiment of the handling system 10 according to FIG. 2, the robot 22 can in particular face the work area 12 so that the acquisition unit 28, which is coupled in terms of movement to the robot 22, can capture an image of the work area 12.

At this time 100, the grip point memory 34 is in particular empty (since no handling cycle has yet taken place). A set $M_s$ of grip point candidates stored in the grip point memory 34 has thus in particular no content.

In a first method step 102-1, at least one image of the work area 12 is then captured by means of the acquisition unit 28.

The at least one image is then analyzed in a further step 104-1 by means of the above-mentioned at least one evaluation algorithm, and a set $M_{e1}$ of grip point candidates is determined (illustrated in FIG. 4 by the box designated by reference sign 36).

In an optional test step 106-1, it is checked for each grip point candidate of the set $M_{e1}$ of determined grip point candidates whether this grip point candidate satisfies a specified storage criterion or not. If this is the case, this grip point candidate is stored in the grip point memory 34. If this test step is carried out for all grip point candidates of the set $M_{e1}$, the set $M_s$ is now composed of at least a subset $M_{es1}$ of the set $M_{e1}$. In principle, it is also conceivable that all grip point candidates of the set $M_{e1}$ satisfy the storage criterion. The set $M_s$ then corresponds at this time in particular to the set $M_{e1}$.

From the set $M_s$ of stored grip point candidates, a grip point candidate is then selected as the target grip point 38-1 (illustrated in FIG. 4 by the boxes designated with reference sign 38-1).

As mentioned above, the grip point candidates stored in the grip point memory can be evaluated and sorted in a ranking list depending on an evaluation. In particular, the grip point candidate at the top of the ranking list can then be selected as the next target grip point.

The robot 22 is then controlled in such a way that it approaches the target grip point 38-1 with the end effector 24, and the end effector 24 grips the corresponding object 14 at the target grip point 38-1 (step 108-1 in FIG. 4).

The end effector 24 is then moved with the gripped object 14 to the target area 18 by means of the robot 22 and the object 14 is deposited there at a target deposition location (step 110-1 in FIG. 4). As mentioned above, the target deposition location can have previously been determined from an image of the target area 18 captured by the detection device 26.

The robot 22 then moves back into a robot position in which the acquisition unit 28 can capture an image of the work area 12 (step 112-1), for example into the starting position mentioned above.

In contrast to the first handling cycle 30 (the very first handling cycle, in the example), however, grip point candidates are now already present in the grip point memory 34. In the specific example, the set $M_s$ now consists in particular of the set $M_{es1}$ of the grip point candidates stored in the first handling cycle, reduced by the grip point candidate previously selected as the target grip point 38-1 (i.e. $M_s=M_{es1}-1$). As mentioned above, the candidate grip point already selected as the target grip point 38-1 may for example have been moved to a separate target grip point memory of the memory device.

In this respect, the robot 22 does not necessarily have to wait for a new grip point determination, but can be controlled in the second handling cycle 32 directly in dependence on a grip point candidate determined in the first handling cycle 30. In this respect, a grip point candidate is again selected from the set $M_s$ ($M_s=M_{es1}-1$) as the target grip point 38-2 and the steps 108-1, 110-1, and 112-2 described above are repeated on the basis of the new target grip point 38-2 (steps 108-2, 110-2, 112-2 in FIG. 4).

During this, at least one image of the work area 18 can be captured again in parallel by means of the acquisition unit 28 (step 102-2 in FIG. 4) and a set $M_{e2}$ of grip point candidates can be determined on the basis of this (step 104-2 in FIG. 4).

As mentioned above, the detection device 26 can also have a plurality of acquisition units 28 (see FIG. 3). It is then conceivable that at least one image of the work area 18 is captured in parallel by means of the acquisition units 28.

A test step 106-2 can again be performed and those grip point candidates of the set $M_{e2}$ that satisfy a specified storage criterion (which may be the same storage criterion as in the first handling cycle 30 or a different one) can then be stored in the grip point memory 34.

The handling cycle 32 can then optionally be repeated multiple times, in particular until all objects 14 or a desired number of objects 14 have been transferred from the work area 12 to the target area 18.

As can be seen in a comparison of the first and second handling cycles 30, 32 in FIG. 4, the total duration of the second handling cycle 32 is shorter than that of the first handling cycle 30 due to the parallel determination of the grip point candidates and the performance of the handling task.

Figure 5:
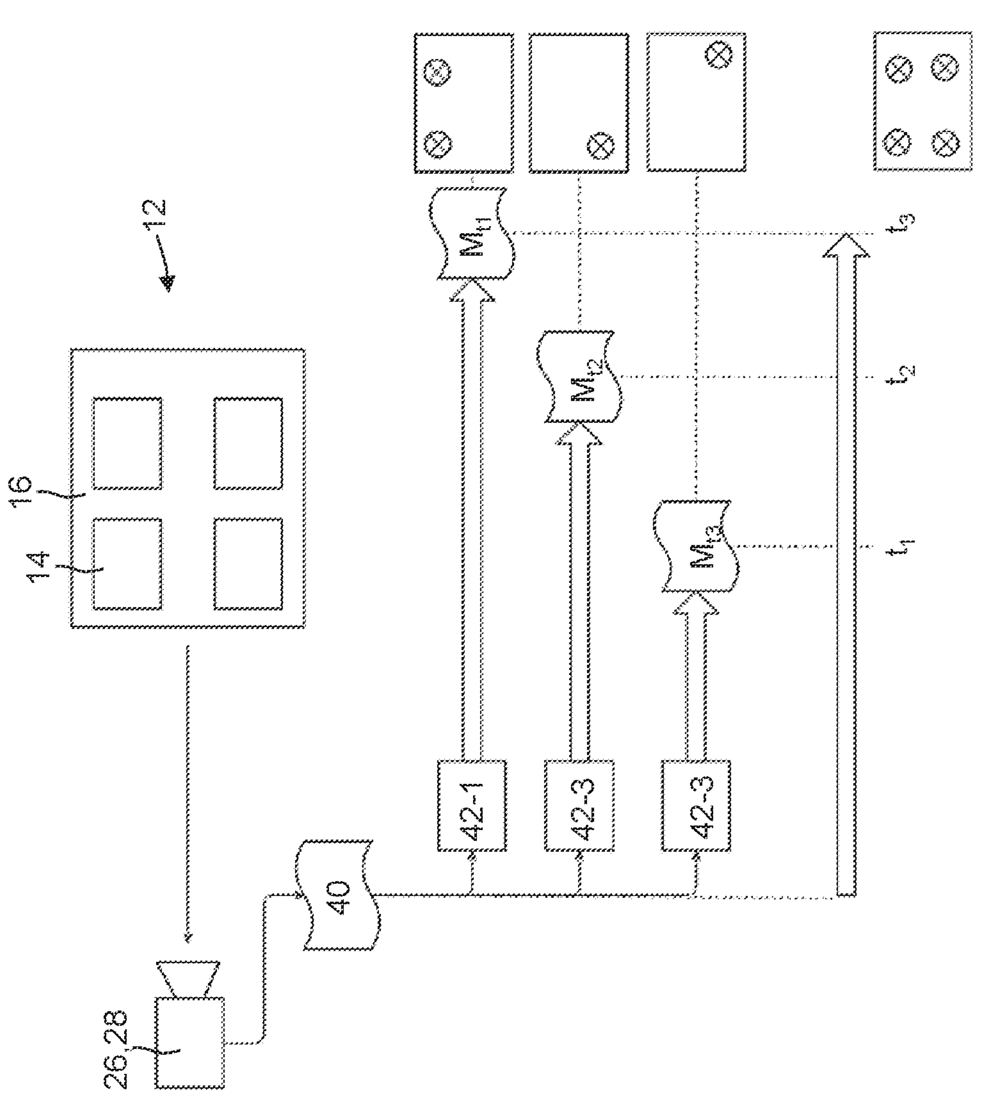
FIG. 5 is a diagram for explaining a grip point determination by means of a plurality of evaluation algorithms.

FIG. 5 shows a simplified schematic representation of an exemplary embodiment of the determination of grip point candidates by means of several evaluation algorithms, in particular running in parallel.

As described above, first at least one image (shown in FIG. 5 by the box designated by reference sign 40) of the work area 12 is recorded by means of the acquisition unit 28.

The at least one image 40, or corresponding image data representing the image of the work area 12, is then analyzed by means of a plurality of, in the example three, evaluation algorithms 42-1, 42-2, 42-3, wherein each evaluation algorithm 42-1, 42-2, 42-3 determines a set $M_{t1}$, $M_{t2}$, $M_{t3}$ of grip point candidates. In the example shown, the sets $M_{t1}$, $M_{t2}$, $M_{t3}$ do not 10 overlap, and to this extent the evaluation algorithms have thus each determined different grip point candidates (in the example, the evaluation algorithm 42-1 has identified grip point candidates on the two upper objects 14, the evaluation algorithm 42-2 has identified a grip point on the object at the bottom left, and the evaluation algorithm 42-3 has identified a grip point candidate on the object at the bottom right). A sum of the sets $M_{t1}$, $M_{t2}$, $M_{t3}$ then forms in particular the above-mentioned set $M_e$ of determined grip point candidates.

In embodiments not shown, it is also conceivable for the evaluation algorithms 42-1, 42-2, 42-3 to partly determine the same grip point candidates. This can be used to prioritize determined grip point candidates. For example, a grip point candidate can be prioritized higher if it was determined by a plurality of evaluation algorithms 42-1, 42-2, 42-3. The determination of a grip point candidate by means of a plurality of evaluation algorithms 42-1, 42-2, 42-3 can in this respect form an evaluation criterion for evaluating grip point candidates.

As shown schematically in FIG. 5, the evaluation algorithms 42-1, 42-2, 42-3 in the example run at different speeds, so that the determination of the subsets $M_t$ of grip point candidates ends at different times $t_1$, $t_2$, $t_3$. In the specific example, the evaluation algorithm 42-3 is the fastest, so that at least one grip point candidate (in the example, a grip point on the object 14 at the bottom right) is already available at time $t_1$. In this respect, the robot 22 can already start a handling task at time $t_1$ by moving the end effector 24 to the grip point, determined by the evaluation algorithm 42-3, on the object 14 at the bottom right. In embodiments not shown, however, it is also conceivable for the evaluation algorithms 42-1, 42-2, 42-3 to be equally fast.

The invention claimed is:

1. A method for handling objects arranged in a work area, by means of a handling system, the method comprising at least one robot on which an end effector for gripping an object is arranged;

a detection device comprising at least one acquisition unit, which is designed to capture an image of the work area;

a control device for controlling the handling system, wherein the control device comprises a data processing system and a non-volatile memory device;

the method comprising performing a plurality of handling cycles one after the other, each handling cycle comprising:

a) capturing at least one image of the work area by means of the detection device;

b) for at least one subset of the objects arranged in the work area: determining, on the basis of the at least one image of the work area, at least one grip point candidate at which a corresponding object can be gripped with the end effector, wherein the determined grip point candidates form a set $M_e$ of grip point candidates;

c) selecting a grip point candidate as the target grip point for the end effector by means of the data processing system;

d) carrying out a handling task comprising moving the end effector to the target grip point, wherein at least one subset $M_{es}$ of the set $M_e$ is stored in a grip point memory of the non-volatile memory device, at least one subset $M_{tes}$ of the grip point candidates $M_{es}$ stored in the grip point memory during a handling cycle remains stored in the grip point memory at least until the next handling cycle, and until the selection of a grip point candidate as the target grip point during the next handling cycle, the target grip point is selected from a set $M_s$ of grip point candidates stored in the grip point memory, and a storage criterion or a plurality of storage criteria are specified, wherein a check is performed as to whether the determined grip point candidates $M_e$ satisfy the storage criterion or at least one of or all of the plurality of storage criteria, wherein, of the set $M_e$ of determined grip point candidates, only those grip point candidates that satisfy the storage criterion or at least one of or all of the plurality of storage criteria are stored in the grip point memory of the non-volatile memory device.

2. The method according to claim 1, wherein the capture of the at least one image of the work area and/or the determination of the grip point candidates takes place temporally overlapping with the performance of the handling task.

3. The method according to claim 1, wherein the specified storage criterion is one of the following storage criteria, or wherein the plurality of storage criteria comprises one or more of the following storage criteria:

grip point candidate has not yet been stored in the grip point memory);

grip point candidate has not yet been selected as a target grip point;

grip point candidate is within a specified distance from grip point candidates already stored in the grip point memory;

grip point candidate is within a specified distance from one or more grip point candidates already selected as the target grip point, and within a specified distance from the last grip point candidate selected as the target grip point or the last n grip point candidates selected as the target grip point.

4. The method according to claim 1, wherein a discard criterion or a plurality of discard criteria are specified, wherein a grip point candidate is removed from the grip point memory, is deleted from the storage device or moved to another deposition location of the storage device, only if the grip point candidate satisfies a specified discard criterion or at least one or all of the plurality of specified discard criteria.

5. The method according to claim 4, wherein the specified discard criterion is one of the following discard criteria or the plurality of specified discard criteria comprises one or more of the following discard criteria:

grip point candidate was already selected as the target grip point;

grip point candidate has already been stored in the grip point memory for longer than a specified expiry time, or for a specified number of handling cycles; and/or grip point candidate was no longer determined in subsequent handling cycle.

6. The method according to claim 1, wherein the grip point candidates already selected as the target grip point are stored in a target grip point memory of the non-volatile memory device.

7. The method according to claim 1, wherein the selection of a grip point candidate from the set $M_s$ of grip point candidates as the target grip point is made under one or more of the following boundary conditions:

approach time of the robot to the grip point candidate starting from a current position of the robot;

distance of the grip point candidate from a current position of the end effector of the at least one robot;

distance of the grip point candidate from the last 1 to n grip point candidates selected as target grip points; and/or position, or coordinates, and/or orientation of the grip point candidate in a coordinate system of the handling system.

8. The method according to claim 1, wherein the grip point candidates $M_s$ stored in the grip point memory are evaluated and sorted in a ranking list as a function of the evaluation, wherein the selection of a grip point candidate from the set $M_s$ of grip point candidates as a target grip point is made in dependence on a position of the grip point candidate in the ranking list, wherein the topmost grip point candidate in the ranking list is selected as the next target grip point.

9. The method according to claim 8, wherein the evaluation is carried out on the basis of one or more of the following evaluation criteria:

number of the repeated determination of the grip point candidate in the context of successive handling cycles;

distance of the grip point candidate from the last 1 to n grip point candidates selected as target grip points;

dwell time of the grip point candidate in the grip point memory; and/or position, or coordinates, and/or orientation of the grip point candidate in a coordinate system of the handling system.

10. The method according to claim 9, wherein a plurality of evaluation criteria are specified, wherein at least one subset of the evaluation criteria is weighted with different strengths, wherein a weighting of the evaluation criteria is variable, or adjustable.

11. The method according to claim 1, wherein the handling system comprises a plurality of different end effectors, wherein determining the grip point candidates comprises determining a preferred end effector for gripping the corresponding object at the respective grip point candidate, wherein performing the handling task comprises providing the preferred end effector for the grip point candidate selected as the target grip point to the at least one robot.

12. The method according to claim 11, wherein the determination of the preferred end effector for a grip point candidate takes place depending on one or more of the following boundary conditions:

position, or coordinates, and/or orientation of the grip point candidate in a coordinate system of the handling system;

weight of the object to be gripped; and/or nature of the surface of the object to be gripped.

13. The method according to claim 1, wherein determining the set $M_e$ of grip point candidates comprises analyzing the at least one image of the work area by means of at least one evaluation algorithm running on the data processing system, wherein the evaluation algorithm comprises methods of image processing.

14. The method according to claim 1, wherein determining the set $M_e$ of grip point candidates comprises analyzing, in parallel, the at least one image of the work area by means of different evaluation algorithms running on the data processing system, wherein each evaluation algorithm determines a subset $M_t$ of grip point candidates, wherein a sum of the subsets $M_t$ forms the set $M_t$ of grip point candidates.

15. The method according to claim 1, wherein the detection device comprises a plurality of acquisition units, wherein capturing the at least one image of the work area comprises capturing, simultaneously, at least one image of the work area by the individual acquisition units.

16. The method according to claim 1, wherein a plurality of robots are provided, wherein for the end effector of a corresponding robot a separate target grip point is selected from the set $M_e$ of grip point candidates stored in the grip point memory, wherein performing the handling task comprises moving a corresponding end effector to the target grip point selected for this end effector.

17. The method according to claim 1, wherein performing the handling task comprises moving the object from the work area to a target deposition location in a target area i or a target container, wherein the detection device is designed to capture an image of the target area, the method further comprising:

capturing at least one image of the target area by means of the detection device, determining, on the basis of the at least one image of the target area, one or more deposition location candidates at which the object can be stored, wherein the determined deposition location candidates form a set $M_a$;

storing at least one subset $M_a$ of the deposition location candidates of the set $M_a$ of deposition location candidates in a deposition location memory of the non-volatile memory device; and selecting a deposition location candidate from a set $M_{as}$ of deposition location candidates stored in the deposition location memory as the target deposition location for the object.

18. A handling system comprising at least one robot on which an end effector for gripping an object is arranged;

a detection device comprising at least one acquisition unit, or a camera, which is designed to capture an image of the work area; and a control device for controlling the handling system, wherein the control device comprises a data processing system and a non-volatile memory device, wherein the control device is configured to carry out and/or performing a plurality of handling cycles one after the other, each handling cycle comprising:

e) capturing at least one image of the work area by means of the detection device;

f) for at least one subset of the objects arranged in the work area: determining, on the basis of the at least one image of the work area, at least one grip point candidate at which a corresponding object can be gripped with the end effector, wherein the determined grip point candidates form a set $M_e$ of grip point candidates;

g) selecting a grip point candidate as the target grip point for the end effector by means of the data processing system;

h) carrying out a handling task comprising moving the end effector to the target grip point, wherein at least one subset $M_{es}$ of the set $M_e$ is stored in a grip point memory of the non-volatile memory device, at least one subset $M_{es}$ of the grip point candidates $M_{es}$ stored in the grip point memory during a handling cycle remains stored in the grip point memory at least until the next handling cycle, and until the selection of a grip point candidate as the target grip point during the next handling cycle, the target grip point is selected from a set $M_a$ of grip point candidates stored in the grip point memory, and a storage criterion or a plurality of storage criteria are specified, wherein a check is performed as to whether the determined grip point candidates $M_e$ satisfy the storage criterion or at least one of or all of the plurality of storage criteria, wherein, of the set $M_e$ of determined grip point candidates, only those grip point candidates that satisfy the storage criterion or at least one of or all of the plurality of storage criteria are stored in the grip point memory of the non-volatile memory device.

* * * * *